United States Patent [19]

Horinouchi et al.

[11] Patent Number: 4,587,804
[45] Date of Patent: May 13, 1986

[54] DEVICE FOR INCREASING AND DEFLECTING THRUST OF JET-PROPULSION ENGINE OF V/STOL AIRCRAFT

[75] Inventors: Shigeru Horinouchi, Mibu; Atsushi Tanaka, Utsunomiya, both of Japan

[73] Assignee: Fuji Jukogyo Kabushiki Kaisha, Tokyo, Japan

[21] Appl. No.: 574,495

[22] Filed: Jan. 27, 1984

[30] Foreign Application Priority Data

Jan. 31, 1983 [JP] Japan ................... 58-14441

[51] Int. Cl.⁴ ............... F02K 1/00; F02K 1/38
[52] U.S. Cl. ................... 60/230; 239/265.35
[58] Field of Search ........... 60/232, 230, 229, 228, 60/263, 264, 271, 266, 269, 39.5; 244/12.4, 12.5, 23 D; 239/265.19, 265.33, 265.35, 265.37, 265.39, 265.41, 265.43, 265.25, 265.27

[56] References Cited

U.S. PATENT DOCUMENTS

| 2,951,660 | 9/1960 | Giliberty | 239/265.33 X |
|---|---|---|---|
| 3,178,887 | 4/1965 | Wilde et al. | 60/232 X |
| 3,380,660 | 4/1968 | Markowski | 239/265.27 |
| 3,527,408 | 9/1970 | Markowski | 239/265.27 |
| 3,806,035 | 4/1974 | Calder | 239/265.41 X |
| 3,979,067 | 9/1976 | Nash | 239/265.35 |
| 4,000,612 | 1/1977 | Wakeman et al. | 60/230 |
| 4,222,234 | 9/1980 | Adamson | 60/230 X |
| 4,295,332 | 10/1981 | Steyer et al. | 60/264 |
| 4,392,615 | 7/1983 | Madden | 244/12.5 X |

FOREIGN PATENT DOCUMENTS

| 1279495 | 11/1961 | France | 60/230 |
|---|---|---|---|
| 1283690 | 12/1961 | France | 239/265.35 |

Primary Examiner—Louis J. Casaregola
Attorney, Agent, or Firm—Martin A. Farber

[57] ABSTRACT

A vertical/short takeoff and landing (V/STOL) aircraft in which the exhaust gas from a jet-propulsion engine is discharged through an exhaust gas passage, secondary air induction passages are formed on the outer sides of the nozzle for communicatively connecting the outside atmosphere to the upstream end of the exhaust gas passage, to induct outside air as secondary air into the exhaust gas passage to be mixed with the exhaust gas. Inlet flap gates are respectively provided at the inlet ends of the secondary air induction passages. A deflector device is provided at the outlet part of the exhaust gas passage and includes guide vanes movable to a central zone in a deflected flow path.

5 Claims, 8 Drawing Figures

DEVICE FOR INCREASING AND DEFLECTING THRUST OF JET-PROPULSION ENGINE OF V/STOL AIRCRAFT

BACKGROUND OF THE INVENTION

This invention relates to devices for increasing and deflecting the thrust of a jet-propulsion engine of vertical or short takeoff and landing (hereinafter referred to as V/STOL) aircraft. More particularly, the invention concerns a thrust increasing and deflecting device for V/STOL aircraft, which device is capable of increasing and, moreover, deflecting the thrust at takeoff or landing of a jet-propulsion engine of a V/STOL aircraft by utilizing the jet reaction.

In general, a V/STOL aircraft is known to possess the double capacity of performing as a VTOL aircraft making possible vertical takeoff and landing and also as a STOL aircraft making possible takeoff and landing with short runway distances. For this purpose, a V/STOL aircraft is provided with means for changing the direction of the engine thrust during the transition flight from takeoff to forward or cruising flight and from forward flight to landing. In a V/STOL aircraft of this character in which the engine thrust used for cruising is utilized as lift force also in takeoff and landing in this manner, a mechanism for deflecting this thrust direction becomes necessary.

In a common conventional thrust deflecting device, a deflector comprising a plurality of panels which can be positionally adjusted is installed to the rear of a jet-propulsion engine and is capable of deflecting the jet flow discharged from the engine to a substantially perpendicularly downward direction.

In a known thrust deflecting device of this character, a loss in the thrust occurs when the jet flow is deflected which gives rise to a drop in the takeoff and landing performance. Furthermore, since the wall inner surface of the deflector is exposed to a jet flow at a high temperature, the panels of the deflector must be constructed of expensive heat-resistant material. Still another problem in the conventional thrust deflecting device has been that, in some instances, the installation of a cooling system has been necessary, which has increased the production cost as well as the weight.

SUMMARY OF THE INVENTION

It is an object of this invention to provide a thrust increasing and deflecting device for V/STOL aircraft in which device loss of thrust accompanying thrust deflection is prevented, and at the same time the deflector can be cooled by introducing a secondary air stream.

According to this invention, briefly summarized, there is provided in a vertical/short takeoff and landing (V/STOL) aircraft in which the exhaust gas from a jet-propulsion engine is discharged through an exhaust gas passage, the combination therewith of a thrust increasing and deflecting device comprising: structures for forming secondary air induction passages for communicatively connecting the outside atmosphere to the upstream end of said exhaust gas passage to induct outside air as secondary air, by ejector action of said exhaust gas, into said exhaust gas passage to be mixed with said exhaust gas; inlet flap gates respectively provided at the inlet ends of said secondary air induction passages and being operable to selectively close and open said air induction passages; and a deflector device provided at the outlet part of said exhaust gas passage and being operable to selectively vary the final direction of discharge of the exhaust gas between an undeflected direction substantially parallel to the engine axis for forward flight and a deflected direction substantially perpendicularly downward relative to said engine axis for V/STOL takeoff or landing, said deflector device including a guide vane device moveably mounted so as to be disposed in a central zone of the deflected flow path defined within said deflector device for preventing separation of flow at an inner side of the deflected flow path in a condition for said deflected direction and respectively so as to be at an outside boundary of said outlet part of said exhaust gas passage when said deflector device is in a condition for said undeflected direction.

The nature, utility, and further features of this invention will be more clearly apparent from the following detailed description with respect to preferred embodiments of the invention when read in conjunction with accompanying drawings, briefly described below.

DETAILED DESCRIPTION OF THE INVENTION

Figure 8:
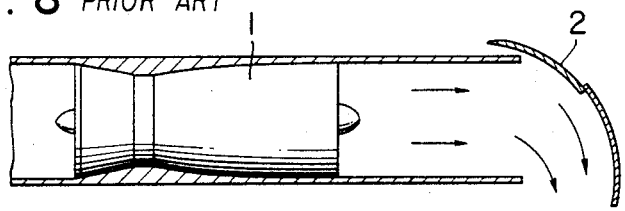
FIG. 8 is a simplified view similar to FIG. 1 showing a conventional thrust deflecting device of a turbine engine.

A typical example of the conventional thrust deflecting device described hereinbefore is illustrated in FIG. 8. A turbine engine or turbojet engine 1 is provided at its aft end with a thrust deflector 2 comprising a plurality of curved panels. A thrust deflecting device of this character is accompanied by the previously described problems, which are solved in the thrust increasing and deflecting device according to this invention.

Figure 1:
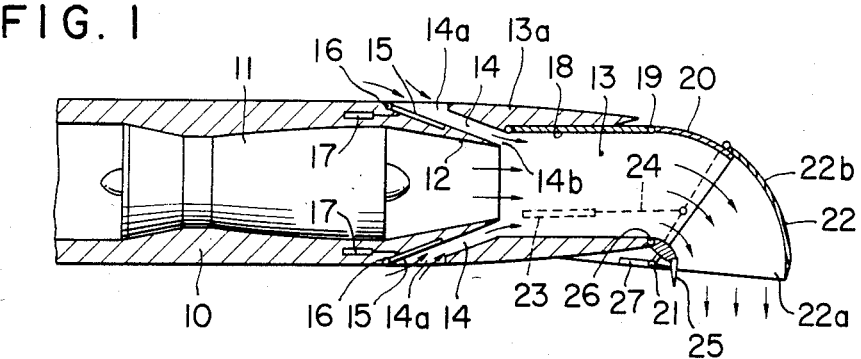
FIG. 1 is a left side (port) elevation, in longitudinal section, showing one example of the thrust increasing and deflecting device according to this invention in its state for vertical takeoff or landing.
Figure 2:
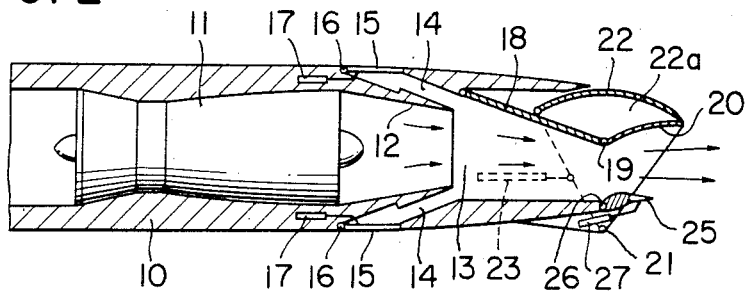
FIG. 2 is a view similar to FIG. 1 showing the same device in its state for forward or cruising flight.

The first example of the thrust increasing and deflecting device for a V/STOL aircraft according to this invention is shown in its state for vertical takeoff and landing and in its state for forward or cruising flight in FIGS. 1 and 2, respectively.

Within an engine housing 10, a turbojet engine 11 is mounted. The gas flow path on an outlet side of this engine 11 is defined by a nozzle 12, the inner cross-sectional shape of which varies from a circle to a rectangle in the direction of the gas flow. Of course, the shape of the interior cross section of the flow path at the inlet and outlet of the nozzle 12 interior may be the same. To the rear of the outlet of this nozzle 12 and contiguously extending rearwardly therefrom is an exhaust passage 13. Secondary air induction passages 14 are formed on outer sides of the nozzle 12 and have respective inlet openings 14a, open to the outside air and respective outlet openings 14b, open to the exhaust passage 13 at an outer side of an outlet lip of the nozzle 12.

The inlet opening 14a of each secondary air induction passage 14 can be opened and closed by an inlet flap gate 15 hinged at one edge by a pivot hinge 16 by an actuator 17. The inlet flap gate 15 can thus be placed in its fully-opened position wherein it is positioned in a complementary recess in and flush with the outer side of the nozzle 12 and alternatively in its fully-closed position wherein it closes the inlet opening 14a, flush with the outer surface of the housing 10. The inlet flap gate 15 is fully opened for vertical takeoff and landing as shown in FIG. 1 and is fully closed for cruising flight as shown in FIG. 2. A hydraulic cylinder device or an air cylinder device is suitable for the actuator 17.

The above-mentioned exhaust passage 13 has a substantially rectangular cross section and has an upper wall 13a with an inner ceiling liner 18. Transversely along and to the rear edge of the ceiling liner 18, an intermediate duct 20 is hinge connected by a hinge 19. A forward edge of a deflector 22 is overlappingly fitted against the outer surface of the intermediate duct 20 along its rear edge when the device is in its downward deflecting state shown in FIG. 1. The deflector 22 comprises an outer wall 22b and side walls 22a of integral construction. The side walls 22a, which are of sector shape, are pivotally supported by a transverse pivot shaft 21. The outer wall of the intermediate duct 20 and the outer wall 22b of the deflector 22 are of arcuate profile in longitudinal section.

The deflector 22 is thereby rotatable in pivotal movement about the pivot shaft 21 and is thus controllably rotated by an actuating rod 24 of an actuator 23. When the deflector 22 is thus rotated up and forward (counterclockwise as viewed in FIGS. 1 and 2), its outer wall 22b rides over the intermediate duct 20 and a rear portion of the ceiling liner 18 as shown in FIG. 2 indicating the state of the device for cruising flight. In this state of the device, the inner ceiling liner 18 and the intermediate duct 20 form an upper wall or ceiling of the exhaust passage 13 of convex character. In longitudinal section, they form a V shape with an obtuse angle, whereby the exhaust passage 13 is gradually constricted at a portion. At the same time, the deflector 22 is disposed above the intermediate duct 20 and the aft portion of the ceiling liner 18 and forms a smooth fairing for the rear portion of the device as well as the engine. The resultant direction of flow of the exhaust gas discharged from the rear end of the device is substantially parallel to the engine longitudinal axis.

On the other hand, when the deflector 22 is rotated downwardly and rearwardly (clockwise as viewed in FIGS. 1 and 2), it forms, in cooperation with the intermediate duct 20, the side walls thereof, the bottom wall of the housing 10 at its rear extremity, and a deflecting flap 25 a smoothly downwardly deflecting flow passage as shown in FIG. 1. The deflecting flap 25 is pivotally supported along its forward edge by a transverse pivot shaft 26 at the rear edge of the bottom wall of the housing 10 and is actuated in rotation about the pivot shaft 26 by an actuator 27.

At the time of vertical takeoff or landing, the actuators 17 are operated to fully open the inlet flap gates 15 thereby to open the secondary air induction passages 14, to the outside air, whereby secondary air is drawn in through these passages 14. At the same time, the actuating rod 24 of the actuator 23 is extended to rotate the deflector 22 about the pivot shaft 21 to the angular position shown in FIG. 1. Also at the same time, the actuator 27 is operated to lower the deflecting flap 25 to an angular position approaching the vertically downward position.

When the thrust increasing and deflecting device is in this state, the jet flow discharged from the turbojet engine is accelerated as it flows through the nozzle 12, flows through the exhaust passage 13, and is deflected vertically downward by the deflector 22. At this time, the deflected flow path formed by the deflector 22 and the flap 25 is of a flat, substantially rectangular shape as viewed in the direction of curvature. For this reason, the exhaust gas loss is held to a minimum, and in addition the construction also becomes advantageously simple.

Since the static pressure within the exhaust gas passage 13 becomes lower than the outside atmospheric pressure, an ejector effect operated to induce outside air as secondary air through the secondary air induction passage 14 into the exhaust gas passage 13. The jet flow from the turbojet engine 11 and the secondary air thus induced are mixed within the exhaust gas passage 13, where transmission of momentum and cooling take place. Since, in the device illustrated in FIG. 1, the cross-sectional shape of the outlet of the nozzle 12 is rectangular, the area of contact of jet flow from the engine 11 and the secondary air is greater than that in the case of a circular cross section, whereby the mixing efficiency is high, and the ejector effect is great.

Since the momentum of the exhaust gas flow is increased by the introduction of the secondary air in this manner, a thrust which is greater than the jet thrust of the turbojet engine 11 by itself can be obtained. Furthermore, the exhaust gas from the engine 11 is cooled by the introduction the secondary air and the mixing therewith, whereby overheating of the deflector 22 can be prevented. As a result, simplification or even elimination of heat-resistant materials and/or cooling means are afforded, which is a significant advantage in the reduction of weight of the aircraft. Furthermore, the lowering of the exhaust gas temperature is advantageous in that heat damage to the runway, the ground, the deck of a ship, and other surfaces at the point of takeoff or landing can be prevented.

Still another advantageous feature of the device is the provision of the deflecting flap 25, by which diffusion of the exhaust gas jet flow is prevented, and, further, lowering of the thrust deflection efficiency due to the formation of local vortexes in the vicinity of the exhaust gas outlet can be prevented.

On the other hand, when the V/STOL aircraft is in its cruising state, the inlet flap gates 15 are fully closed as shown in FIG. 2, and as mentioned hereinbefore, and the deflector 22 is in its most retracted position. When the deflector 22 is in this state, the ceiling liner 18 and the intermediate duct 20 from a V with an obtuse angle as viewed in longitudinal side section, and the outer wall 22b has rotated around and atop this V. The exhaust gas passage 13 then assumes a shape which is constricted toward its outlet. At the same time, the deflecting flap 25 is in a raised state in a suitable angular position.

Figure 3:
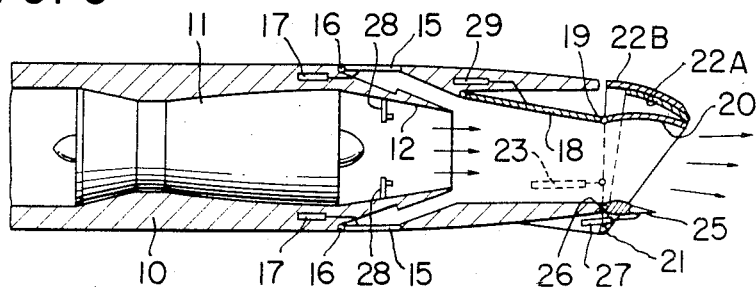
FIG. 3 is a view similar to FIG. 2 showing an example of a thrust increasing and deflecting device according to another embodiment of the invention.

Another embodiment of this invention is shown in FIG. 3, in which those parts which are the same as or equivalent to corresponding parts in FIG. 1 are designated by like reference numerals. Here an after-burner 28 is provided as a reheating device at an intermediate position in the nozzle 12 and operates to increase the energy of the exhaust gas and the thrust. Futhermore, since it is necessary to enlarge the nozzle throat area for reheating, the deflector 22 comprises mutually slidably fitted deflector elements 22A and 22B, and the ceiling liner 18 is adapted to be moved by an actuator 29 thereby to adjustably vary the nozzle throat area.

Figure 4:
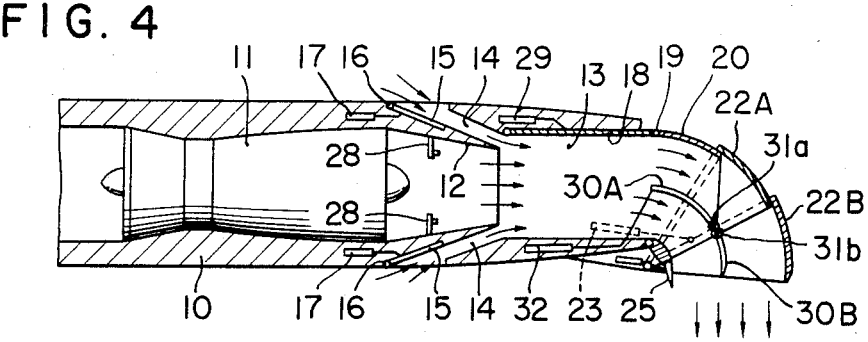
FIG. 4 is a view similar to FIG. 1 showing an example of the device according to still another embodiment of the invention, the device being shown in its state for vertical takeoff or landing.

In still another embodiment of this invention as illustrated in FIG. 4, in a deflecting flow passage defined by two deflectors 22A and 22B and a deflecting flap 25, a guide vane device comprising two guide vanes 30A and 30B is provided to prevent separation of flow at the inner side of the deflected flow path and to improve the conformity of the exhaust gas deflection angle with respect to the deflector angle. At the same time, these guide vanes 30A and 30B serve to minimize the thrust loss due to separation of flow.

Figure 5:
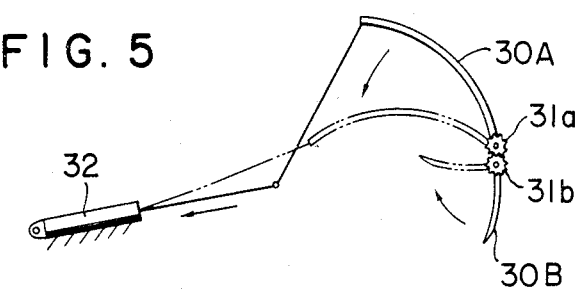
FIG. 5 is a relatively enlarged left side elevation showing guide vanes and an actuator in the device shown in FIG. 4 and indicating the manner in which the guide vanes are rotated by the actuator.
Figure 6:
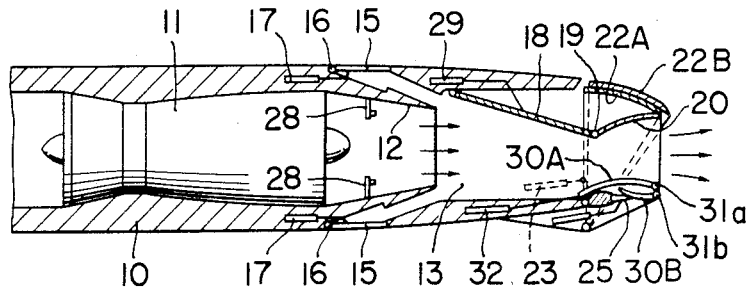
FIG. 6 is a view similar to FIGS. 2 and 3 of the device shown in FIG. 4 in its state for cruising flight.

In FIG. 5, these guide vanes 30A and 30B are shown synchronously coupled at their rotational axes by intermeshed gears 31a and 31b, and the guide vane 30A is driven in rotating movement by an actuator 32. At the time of cruising flight, as shown in FIG. 6, the guide vanes 30A and 30B are neatly folded, and a nozzle throat is formed between the concave surface of the guide vane 30A and the combination of the ceiling liner 18 and the intermediate duct 20. In this folding action of the guide vanes, the lower guide vane 30B is folded rearwardly and upwardly in synchronism with the forward and downward swinging of the guide vane 30A driven by the actuator 32. In this example, also, the ceiling liner 18 can by moved by means of the actuator 29 to adjustably vary the nozzle throat area.

Figure 7:
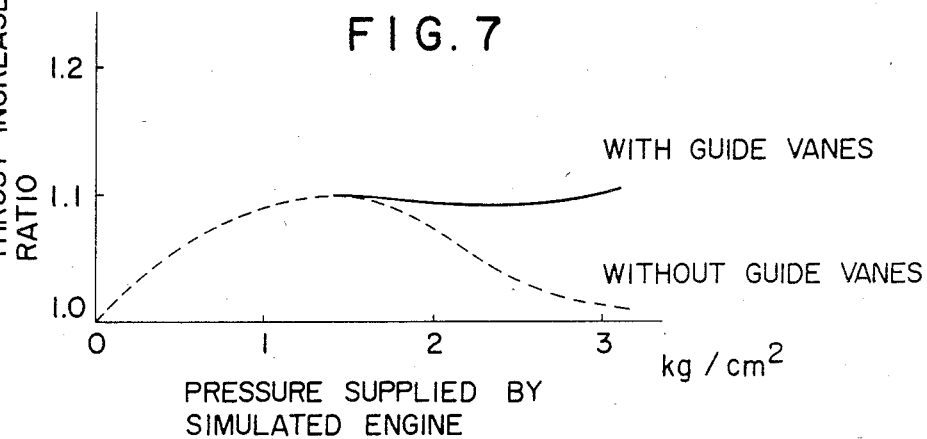
FIG. 7 is a graph indicating the results of experiments on increasing thrust according to the invention.

The thrust increasing effect of the thrust increasing and deflecting device according to this invention is indicated in FIG. 7. As is apparent from this graph, a thrust increasing effect of a maximum of approximately 10 percent can be expected, and, further, in the case where thrust loss due to separation of flow is minimized by providing guide vanes in the deflected flow path, a thrust increase greater than 10 percent is also possible.

From the foregoing disclosure it will be seen that, in accordance with this invention, because secondary air is induced from the outside atmosphere into the exhaust gas passage 13 by an ejector effect at the time of takeoff or landing, the jet flow, and therefore the thrust, can be increased. Furthermore, as a result of the mixing of the outside air of relatively low temperature thus induced and the jet flow exhausted from the turbojet engine, the temperature of the jet flow is lowered, whereby the heat-withstanding character for the deflector is facilitated. In addition, by installing guide vanes within the deflecting passage of the deflector, separation of the jet flow can be prevented thereby minimizing thrust loss.

What is claimed is:

1. In a vertical/short takeoff and landing (V/STOL) aircraft in which exhaust gas from a jet-propulsion engine defining an engine axis is discharged through an exhaust gas passage, a thrust increasing and deflecting device comprising means defining secondary air induction passages for communicatively connecting outside atmosphere to an upstream end of said exhaust gas passage to induct outside air as secondary air, by ejector action of said exhaust gas, into said exhaust gas passage so as to mix with said exhaust gas, inlet flap gates respectively at inlet ends of said secondary air induction passages and being operable to selectively close and open said air induction passages, deflector means at an outlet part of said exhaust gas passage for being operable to selectively vary final direction of discharge of the exhaust gas between an undeflected direction substantially parallel to the engine axis for forward flight and respectively a deflected flow path defining a deflected direction substantially perpendicularly downward relative to said engine axis for V/STOL takeoff or landing, said deflector means including a guide vane device moveably mounted so as to be disposed in a central zone of the deflected flow path defined within said deflector means for preventing separation of flow at an inner side of the deflected flow path in a condition for said deflected direction and respectively so as to be at an outside boundary of said outlet part of said exhaust gas passage when said deflector means is in a condition for said undeflected direction, said guide vane device comprises guide vanes, and intermeshing gears defining rotational axes respectively synchronously coupled to said guide vanes.

2. The thrust increasing and deflecting device according to claim 1, wherein said guide vanes are positioned in tandem relative to each other and together in parallel to a longitudinal curving of said deflected flow path in said condition for the deflected direction, and define a continuous uniform curvature.

3. The thrust increasing and deflecting device according to claim 2, wherein said guide vanes comprise two guide vanes which are curved and pivotally connected at respective adjacent pivot points by means of said intermeshing gears.

4. The thrust increasing and deflecting device according to claim 3, wherein said two guide vanes are folded over with respect to each other in said condition for the undeflected direction defining at the outlet part of said exhaust gas passage in cooperation with a part of said deflector means an increasing flow cross-section in the downstream direction.

5. The thrust increasing and deflecting device according to claim 3, wherein one of said guide vanes is an upstream-most of said guide vanes, actuator means connected to a forward free end portion of said upstream-most vane for moving said vanes.

* * * * *